G. W. DODSON.
Coffee-Roasters.
No. 139,377.　　　　　　　　　　Patented May 27, 1873.
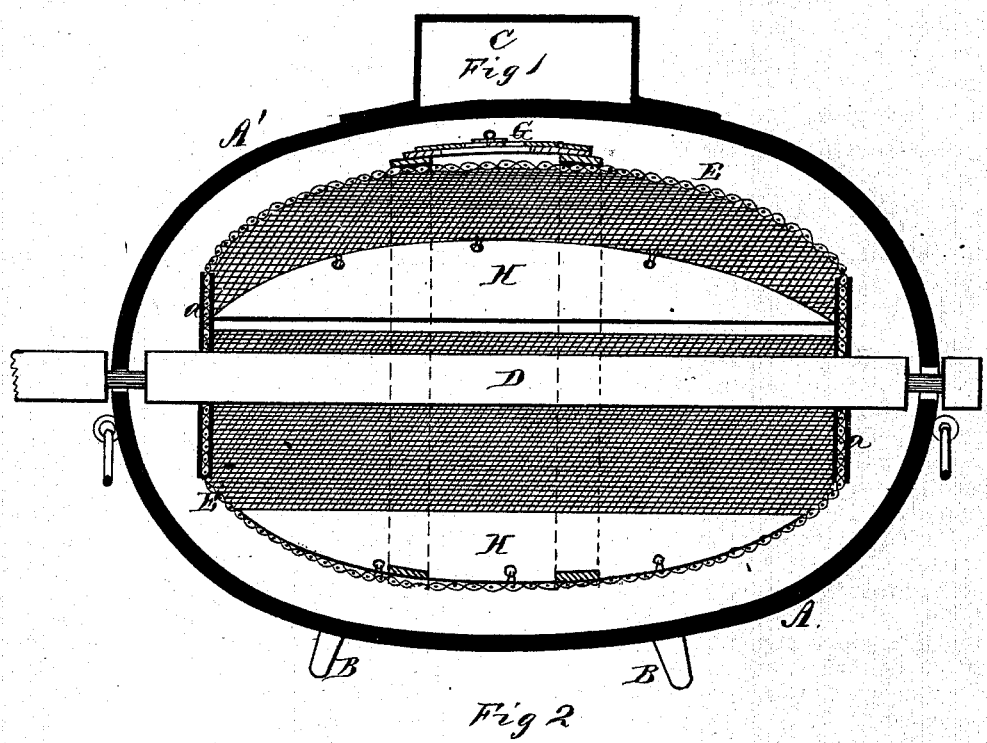
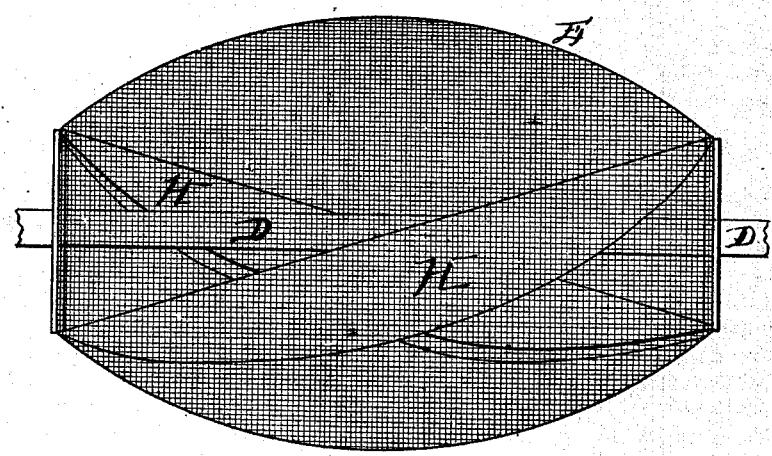
Witnesses:
Franck L. Durand
E. L. Evert
Inventor.
George W. Dodson
per
Alexander Mason
Attorneys.

UNITED STATES PATENT OFFICE.

GEORGE W. DODSON, OF MITCHELL, INDIANA.

IMPROVEMENT IN COFFEE-ROASTERS.

Specification forming part of Letters Patent No. 139,377, dated May 27, 1873; application filed March 14, 1873.

*To all whom it may concern:*

Be it known that I, GEORGE W. DODSON, of Mitchell, in the county of Lawrence and in the State of Indiana, have invented certain new and useful Improvements in Coffee-Roasters; and do hereby declare that the following is a full, clear, and exact description thereof, reference being had to the accompanying drawings and to the letters of reference marked thereon making a part of this specification:

My present invention relates to an improvement upon the device for which Letters Patent were granted to me on the 23d of April, 1872, No. 126,037. In that patent I show an outer sphere inclosing an inner sphere, the latter being formed of two concavo-convex heads, connected by ribs and the space between covered by a wire-gauze band, the device there shown to be used on a single stove-hole, and the interior sphere operated by a central shaft.

In the invention hereinafter described, the roaster is intended for large families, hotels, restaurants, &c., or places where it is desired to roast large quantities of coffee at one time. To this end I construct the outer shell in elliptical form, so as to fit the top of the stove, when the two stove-lids and central piece are taken from the stove. The interior shell is made of gauze-wire, excepting the ends, which are flattened and protected on both sides by a metal plate. Within the interior shell is placed diagonal wings, whereby the coffee is kept continually stirred as the shell is revolved, and is kept to the center of the shell where the most heat is had, so that the roasting will be equal on all of the inclosed coffee and on all sides of the same.

In order to enable others skilled in the art to which my invention appertains to make and use the same, I will now proceed to describe its construction and operation, referring to the annexed drawing, in which—

Figure 1 represents a longitudinal vertical section of my invention, and Fig. 2 a plan view of the interior screen, showing the diagonal wings on the inside thereof.

A A' represent the outer case cast in elliptic form, as shown, and bisected horizontally in two equal parts, the lower half A provided with legs B B to rest on a stove after the two covers and middle piece have been removed, as when putting a wash-boiler on the stove. The upper half A' is provided with a handle, C, and forms the cover for the roaster. In suitable notches made in the upper edge of the lower half A, at the ends rests a shaft, D, upon which is secured the inner case E, made of wire-cloth, and provided with double metallic heads *a a*. This wire-cloth case E is provided with a hinged door, G, through which the coffee is admitted into the case. Inside of the case E are fastened two or more inclined bars or wings H, which serve to agitate and turn the coffee while the shaft and interior case revolves, so that the coffee will be equally burned on all sides by the hot air surrounding it in the outer case A.

By this formation of the shell of the roaster, the device is applied to the entire open space of the stove when the two stove-hole plates and the middle piece between have been removed, and the inclined wings in the roaster keep the coffee agitated so as to roast it equally on all sides.

Having thus fully described my invention, what I claim as an improvement upon my previous patent above referred to, and desire to secure by Letters Patent, is—

The combination of the elliptical-shaped cases A A', the shaft D, and the interior screen-case E, provided with door G and inclined wings H H, all constructed substantially as set forth.

In testimony that I claim the foregoing, I have hereunto set my hand this 17th day of February, 1873.

GEORGE W. DODSON.

Witnesses:
ANDREW J. NOE,
FRANK W. ANTONIESKI.